United States Patent
Denker et al.

(10) Patent No.: US 10,403,256 B2
(45) Date of Patent: Sep. 3, 2019

(54) RESONATOR WITH RING-SHAPED CHAMBER BETWEEN AN INNER TUBE AND AN OUTER WALL AND WITH A DIVIDING RIB EXTENDING FROM THE INNER TUBE TOWARD THE OUTER WALL

(71) Applicants: Umfotec GmbH, Northeim (DE); Dietrich Denker, Ostfildern (DE)

(72) Inventors: Dietrich Denker, Ostfildern (DE); Ralf Buck, Kipfenberg/Schelldorf (DE)

(73) Assignees: UMFOTEC GMBH (DE); PROF. DR. DIETRICH DENKER (DE)

( * ) Notice: Subject to any disclaimer, the term of this patent is extended or adjusted under 35 U.S.C. 154(b) by 193 days.

(21) Appl. No.: 15/522,367

(22) PCT Filed: Oct. 30, 2015

(86) PCT No.: PCT/EP2015/075334
§ 371 (c)(1),
(2) Date: Apr. 27, 2017

(87) PCT Pub. No.: WO2016/066836
PCT Pub. Date: May 6, 2016

(65) Prior Publication Data
US 2017/0316771 A1    Nov. 2, 2017

(30) Foreign Application Priority Data
Oct. 31, 2014  (DE) .................. 10 2014 115 898

(51) Int. Cl.
G01K 11/04      (2006.01)
F02M 35/12      (2006.01)
(Continued)

(52) U.S. Cl.
CPC .......... *G10K 11/04* (2013.01); *F02M 21/0206* (2013.01); *F02M 35/1266* (2013.01); *Y02T 10/32* (2013.01)

(58) Field of Classification Search
CPC ............... F02M 35/12; F02M 35/1266; F02M 35/10144; F02M 35/1255; F02M 35/1233;
(Continued)

(56) References Cited

U.S. PATENT DOCUMENTS 1,821,688 A * 9/1931 Bourne .................. F01N 1/02
                                            181/264
2,323,955 A    7/1943 Wilson
(Continued)

FOREIGN PATENT DOCUMENTS

CN        1637269      7/2005
CN        102575538    7/2012
(Continued)

OTHER PUBLICATIONS

English Translation of International Preliminary Report on Patentability dated Feb. 24, 2017.
(Continued)

*Primary Examiner* — Edgardo San Martin
(74) *Attorney, Agent, or Firm* — Gerald E. Hespos; Michael J. Porco; Matthew T. Hespos

(57) ABSTRACT

A resonator (1, 1', 1") for reducing airborne noise has at least one first ring-shaped chamber (2, 2', 2") arranged between an inlet piece (6, 6') and an outlet piece (7, 7'). An inner tube (3) or inner tube pieces (4, 4", 5) are arranged between the inlet piece (6, 6') and outlet piece (7, 7') and have wall apertures (18, 19, 28, 28", 29, 29", 30, 30") as a connection to the adjacent ring-shaped chamber (2, 2', 2"). The first ring-shaped chamber (2, 2', 2") is divided by at least one
(Continued)

radially encircling dividing rib (13, 13', 13") into at least two sub-chambers (14, 14', 14", 15, 15', 15"). The dividing rib (13, 13', 13") has a free end that, relative to the wall that is adjacent in a radial direction, forms an encircling annular space (16) for receiving an air layer that co-resonates in steady-state.

10 Claims, 3 Drawing Sheets

(51) Int. Cl.
    *F01N 1/02* (2006.01)
    *G10K 11/04* (2006.01)
    *F02M 21/02* (2006.01)
    *G10K 11/02* (2006.01)
    *F01N 1/00* (2006.01)

(58) Field of Classification Search
    CPC .......... F16L 55/033; F01N 1/02; F01N 1/003; F01N 1/026
    See application file for complete search history.

(56) References Cited

U.S. PATENT DOCUMENTS

| | | | | |
|---|---|---|---|---|
| 3,092,206 A * | 6/1963 | Moreau | F01N 1/083 | 181/270 |
| 3,113,635 A * | 12/1963 | Allen | F01N 1/10 | 181/252 |
| 4,027,740 A * | 6/1977 | Martin | F01N 1/083 | 181/281 |
| 4,055,231 A * | 10/1977 | Martinez | F01N 1/22 | 181/241 |
| 4,244,442 A * | 1/1981 | Scarton | F01N 1/003 | 181/230 |
| 4,346,781 A * | 8/1982 | Ingard | F16L 55/02 | 181/206 |
| 4,874,062 A * | 10/1989 | Yanagida | F01N 1/02 | 181/250 |
| 6,508,331 B1 | 1/2003 | Stuart | | |
| 6,983,820 B2 * | 1/2006 | Boast | F01N 1/003 | 181/232 |
| 7,367,424 B2 * | 5/2008 | Brown | B64D 41/00 | 181/249 |
| 7,810,609 B2 * | 10/2010 | Sikes | F01N 1/24 | 181/246 |
| 7,934,581 B2 * | 5/2011 | Kim | F04D 29/665 | 123/184.53 |
| 8,256,571 B1 * | 9/2012 | Butler | 181/268 | |
| 8,323,556 B2 * | 12/2012 | Khami | F02B 33/44 | 264/510 |
| 8,408,357 B2 * | 4/2013 | Cheung | F02M 35/1216 | 123/184.53 |
| 9,010,485 B2 * | 4/2015 | Bornemann | F02M 35/10144 | 181/212 |
| 9,175,648 B2 * | 11/2015 | Dobrin | F02M 35/1261 | |
| 9,625,077 B2 * | 4/2017 | Barbolini | F16L 55/033 | |
| 2003/0173146 A1 | 9/2003 | Wolf et al. | | |
| 2014/0196977 A1 | 7/2014 | Hartmann | | |
| 2018/0223779 A1 * | 8/2018 | Buck | F02M 35/1266 | |

FOREIGN PATENT DOCUMENTS

| | | |
|---|---|---|
| CN | 203335225 | 12/2013 |
| DE | 199 56 172 | 5/2001 |
| DE | 10 2008 015 353 | 9/2009 |
| DE | 10 2008 032 491 | 1/2010 |
| DE | 2 256 330 | 12/2010 |
| EP | 2 757 235 | 7/2014 |
| JP | 9-177627 | 7/1997 |
| WO | WO-2015055310 A1 * | 4/2015 ......... F02M 35/1216 |

OTHER PUBLICATIONS

International Search Report dated Feb. 15, 2016.
Chinese Office Action dated Aug. 31, 2018.

* cited by examiner

RESONATOR WITH RING-SHAPED CHAMBER BETWEEN AN INNER TUBE AND AN OUTER WALL AND WITH A DIVIDING RIB EXTENDING FROM THE INNER TUBE TOWARD THE OUTER WALL

BACKGROUND

1. Field of the Invention

The invention relates to a resonator for reducing airborne noise having at least a first ring-shaped chamber arranged between an inlet piece and an outlet piece, and having an inner tube or inner tube pieces arranged between the inlet piece and the outlet piece, with wall apertures being provided as a connection to the adjacent ring-shaped chamber.

2. Description of the Related Art

DE 603 01 437 T2 discloses a resonator for reducing airborne noise with ring-shaped chambers arranged between an inlet piece and an outlet piece. An inner pipe serving as a conduit is arranged between the inlet piece and outlet piece. The inner tube has wall apertures serving as a connection to the adjacent ring-shaped chambers. The adjacent ring-shaped chambers are each separated from one another by means of a constriction of an outer pipe, which delimits the ring-shaped chambers in a radial outward direction.

With regard to the known resonator, it is disadvantageous that a passage, which ensures a supply flow from one chamber to the next, is arranged between the constriction and the inner tube. This arrangement is intended to avoid complicated seals which are replaced by a leakage flow.

Furthermore, DE 199 56 172 B4 discloses a resonator for reducing airborne noise by means of ring-shaped chambers arranged between an inlet piece and an outlet piece. Inner tube pieces are arranged as a conduit between the inlet piece and the outlet piece. The conduit is connected to the ring-shaped chambers by way of circumferential slits formed between the ends of inner tube pieces.

With regard to this known resonator, which has basically proved reliable, it is disadvantageous that additional adjustment options are desirable to improve the frequency-dependent silencing values, without requiring complicated inner seals.

The purpose of the present invention is to improve the known resonators. In particular, by means of a simple design, it is intended to improve the silencing values and their adjustment options while avoiding complicated seals as well as undesired leakage flows.

SUMMARY

This problem is solved in connection with the features of the preamble of claim 1 in that the first ring-shaped chamber is subdivided by at least one radially encircling dividing rib into at least two sub-chambers and in that the dividing rib has a free end which forms, toward the adjacent wall in a radial direction, an encircling annular space to accommodate an air layer that co-resonates in steady-state fashion.

The arrangement of a radially encircling dividing rib makes it relatively easy to divide the ring-shaped chamber into two sub-chambers. The fact that the dividing rib has a free end that forms, toward the adjacent wall, an encircling annular space to accommodate an air layer that co-resonates in steady-state fashion makes it possible to dispense with relatively complicated seals, on the one hand, while on the other hand avoiding leakage flows, since the air layer accommodated by the annular space remains stationary at that point and only co-resonates. The mass inertia of the air layer therefore prevents leakage flows between the sub-chambers via the dividing rib. This improves the silencing values, on the one hand, while providing more adjustment options, on the other.

According to a preferred embodiment of the invention, the dividing rib is designed as an encircling double rib, where the double rib delimits a circumferential gap, and said gap is open to the circumferential annular space (for the purposes of this application, "double rib" also refers to multiple ribs with multiple gaps). In conjunction with the circumferential annular space, the circumferential gap creates a type of labyrinthine seal, which encourages the air layer that is co-resonating in steady-state fashion to remain in place.

According to another preferred embodiment of the invention, the inner tube or inner tube piece delimiting the sub-chambers has wall apertures forming a connection to the adjacent sub-chamber. In this way, each of the two sub-chambers is connected to the inflow via the inlet piece and the inner tube.

At least one of the sub-chambers may have a circumferential control fin. In the radial direction, the control fin is the same height as or lower than the dividing rib. By means of the same or a lower height of the control fins and the lack of a gap, it is ensured that the control fins do not actually function as a seal but rather enable a controlled build-up of pressure resonance. This further augments the adjustment options. In particular, by introducing control or dummy fins, it is possible to obtain an additional stable base resonance and higher-frequency reactions, which enable additional design adjustments with a larger silencing range.

According to one embodiment, the height of the annular space in the radial direction between the free end of the dividing rib and the adjacent wall is between 0.3 and 2 mm. Furthermore, it is preferable for the height of the annular space to be between 0.5 and 1.5 mm. A height of 1 mm for the annular space has proved especially effective.

The dividing rib may be arranged on the inner tube or the inner tube piece, with the wall adjacent to the free end of the dividing rib being formed by the outer wall of the first ring chamber, said wall facing away from the inner tube or tube piece. In principle, the dividing rib can however also be arranged on the outer wall of the first ring-shaped chamber, with the wall adjacent to the free end of the dividing rib being formed by the inner tube or the first inner tube piece.

The inlet piece may be attached to a pot-like first jacket-sheath, the cylindrical wall of which forms the outer wall of the first ring-shaped chamber and whose ring-shaped side wall forms a connection to the inlet piece while simultaneously forming the lateral delimitation of the first ring-shaped chamber toward the inlet piece.

The outlet piece may be formed by an extension of the inner tube, with the outlet piece having, in the direction of the inlet piece, a ring-shaped lateral wall that forms the lateral delimitation of the first ring-shaped chamber towards the outlet piece.

The end of the first inner tube piece facing away from the inlet piece may have a ring-shaped lateral wall that forms the lateral delimitation of the first ring-shaped chamber toward the outlet piece and via which the first inner tube piece is connected with the first jacket-sheath. The outlet piece transitions into the second inner tube piece, and the outlet piece penetrates the base of a pot-shaped second jacket-sheath, the cylindrical wall of which, at its end facing toward the first jacket-sheath, is connected to the ring-shaped lateral wall that also forms a first lateral wall for a second ring-shaped chamber, the second lateral wall of which is formed by the base of the pot-shaped second jacket-sheath.

Further features and advantages of the invention result from the following specific description and the drawings.

DETAILED DESCRIPTION

A resonator 1 to reduce airborne noise essentially consists of a first ring-shaped chamber 2, an inner tube 3 or inner tube pieces 4, 5.

Figure 1:
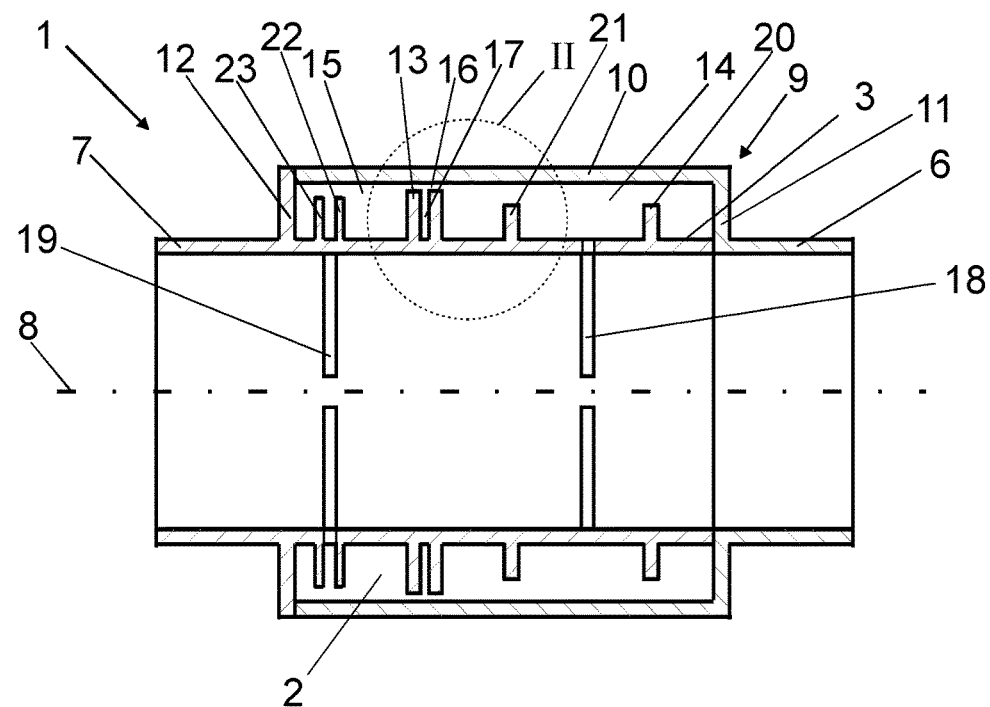
FIG. 1 a lateral cross-sectional view of a resonator with a ring-shaped chamber divided into two sub-chambers.

The first ring-shaped chamber 2 is arranged between an inlet piece 6 and an outlet piece 7. As seen in FIG. 1, the first ring-shaped chamber 2 is delimited inwardly towards the longitudinal axis 8 by the inner tube 3. The inlet piece 6 is attached to a pot-like first jacket-sheath 9, the cylindrical wall of which forms the outer wall 10 of the first ring-shaped chamber 2, and the ring-shaped lateral wall 11 of which, serving as a connection to the inlet piece 6, simultaneously forms the lateral delimitation of the first ring-shaped chamber 2 in the direction of the inlet piece 6.

In the exemplary embodiment seen in FIG. 1, the outlet piece 7 is formed by an extension of the inner tube 3. The outlet piece 7, in the direction of the inlet piece 6, has a ring-shaped lateral wall 12 that forms the lateral delimitation of the first ring-shaped chamber 2 in the direction of the outlet piece 7.

In the exemplary embodiment seen in FIG. 1, the first ring-shaped chamber 2 is subdivided, by a dividing rib 13, which radially encircles the inner tube 3, into a first sub-chamber 14 and a second sub-chamber 15. In the radial direction toward the adjacent wall, which in the exemplary embodiment is the outer wall 10 of the first ring-shaped chamber 2, the dividing rib 13 has a circumferential annular space 16 to accommodate a layer of air co-resonating in steady-state fashion (not shown).

Figure 2:
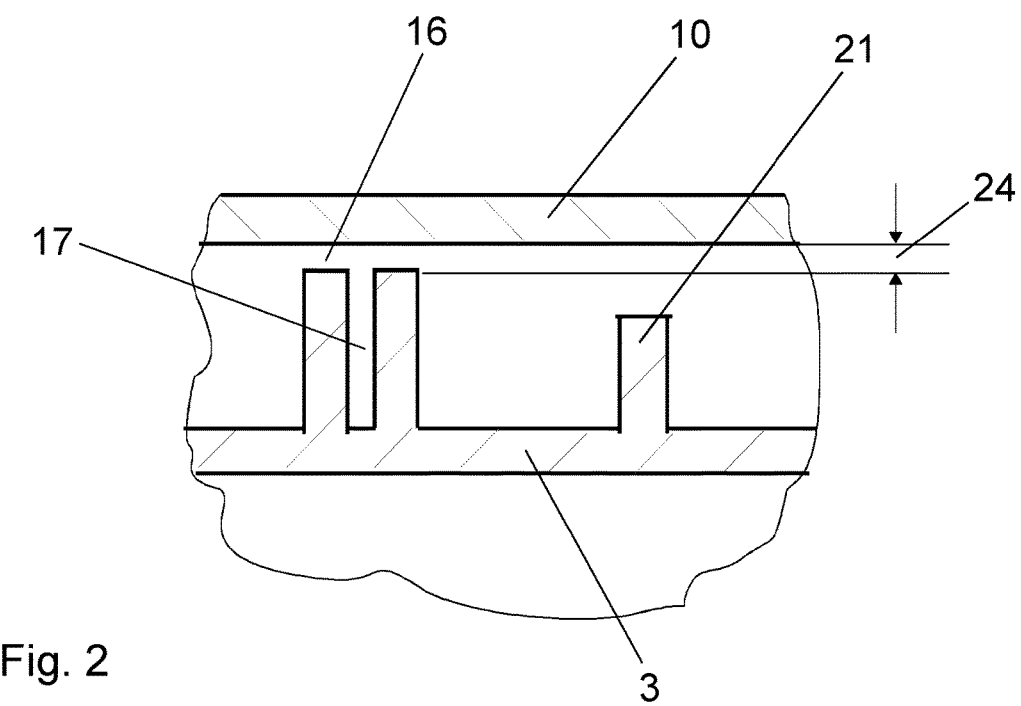
FIG. 2 an enlarged depiction of detail II of FIG. 1.

The dividing rib 13 is designed as a circumferential double rib that delimits a circumferential gap 17. The gap 17 is open in the radial direction toward the annular space 16. The inner tube 3 that delimits the sub-chambers 14, 15 has wall apertures 18 forming a connection to the first sub-chamber 14 and wall apertures 19 forming a connection to the second sub-chamber 15. In the exemplary embodiment shown in FIG. 1, the first sub-chamber 14 has two circumferential control fins, 20, 21. Similarly, the second sub-chamber 15 has two control fins 22, 23. The wall apertures 18 are arranged between the control fins 20, 21, and the wall apertures 19 are arranged between the control fins 22, 23. As shown in FIGS. 1 and 2, the annular space 16 has a height 24 of 1 mm.

Figure 3:
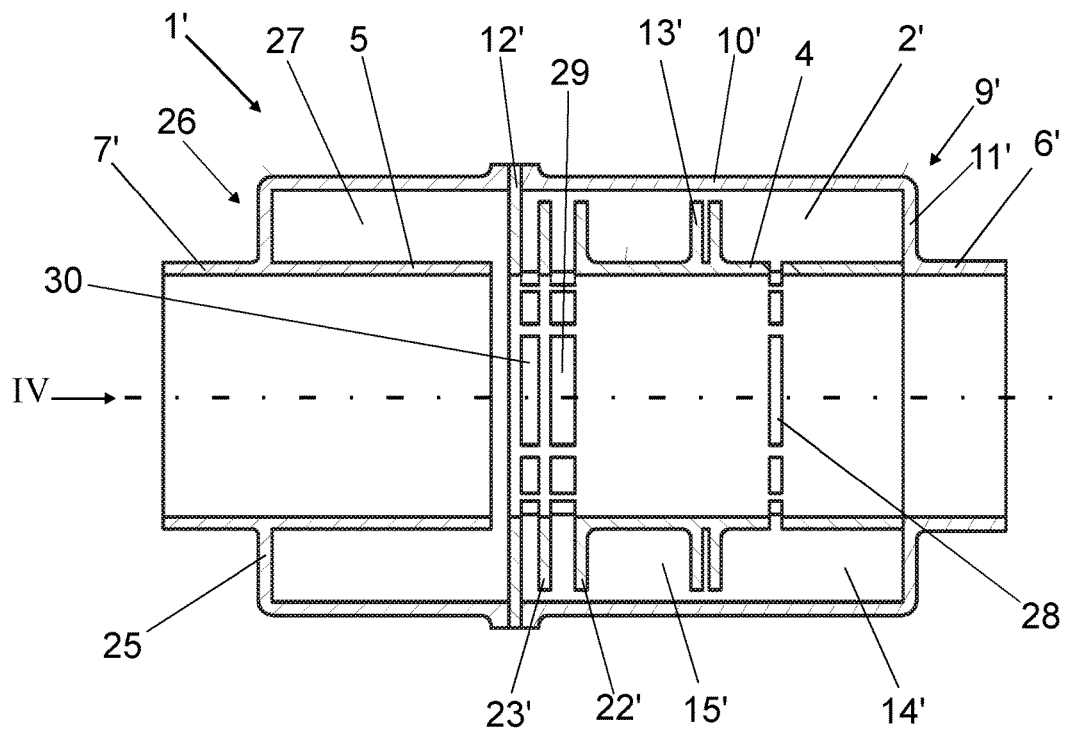
FIG. 3 a lateral cross-sectional view of another resonator with a first ring-shaped chamber divided into two sub-chambers, and a second ring-shaped chamber.
Figure 4:
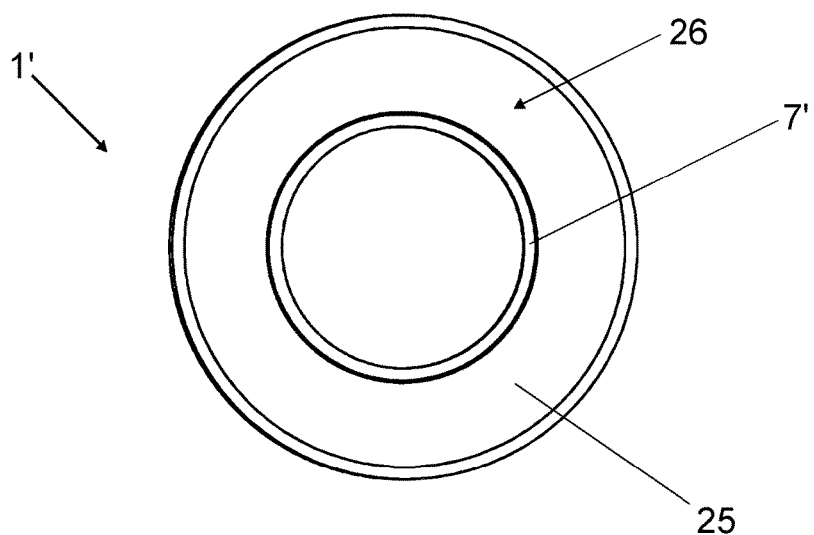
FIG. 4 A lateral view of the resonator from FIG. 3 as viewed from Direction IV.

According to the exemplary embodiment shown in FIG. 3, the dividing rib 13' is arranged on the first inner tube piece 4 of the resonator 1'. At its end facing away from the inlet piece 6', the first inner tube piece 4 has a ring-shaped lateral wall 12', which forms the lateral delimitation of the first ring-shaped chamber 2' in the direction of the outlet piece 7' and is connected by means of the first inner tube piece 4 to the pot-like first jacket-sheath 9', which opposite the dividing rib 13' forms the outer wall 10' of the first ring-shaped chamber 2'.

As shown in the exemplary embodiment depicted in FIG. 3, the outlet piece 7' transitions into the second inner tube piece 5. By means of the inner tube piece 5, the outlet piece 7' penetrates the base 25 of a pot-shaped second jacket-sheath 26, the cylindrical wall of which is connected, at its end facing the first pot-shaped jacket sheath 9', to the ring-shaped lateral wall 12', which also forms a first lateral wall for a second ring-shaped chamber 27, the second lateral wall of which is formed by the base 25 of the second jacket-sheath 26.

As shown in the exemplary embodiment in FIG. 3, the first sub-chamber 14' has no control fins. The second sub-chamber 15' has two control fins 22', 23'.

The first sub-chamber 14' has wall apertures 28 in the first inner tube piece. The second sub-chamber 15' has wall apertures 29 between the control fins 22' and 23' and has wall apertures 30 between the control fin 23' and the lateral wall 12'.

Figure 5:
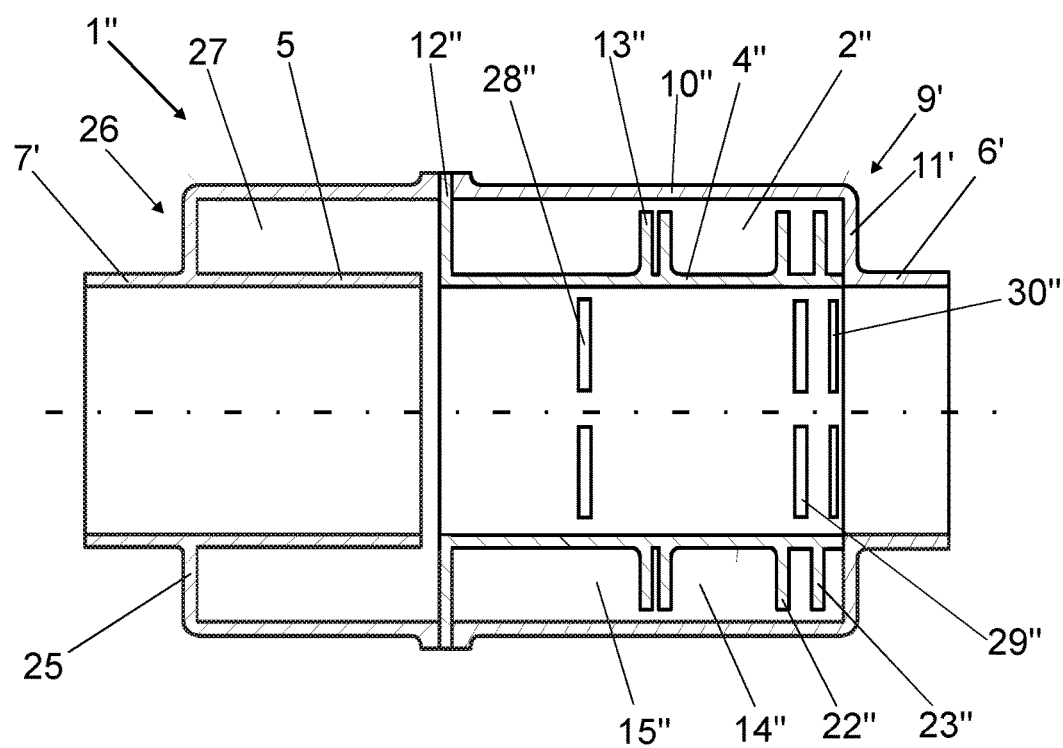
FIG. 5 a lateral cross-sectional view of another resonator with a first ring-shaped chamber divided into two sub-chambers, and a second ring-shaped chamber.

The resonator 1" in the exemplary embodiment shown in FIG. 5 has jacket-sheaths 9', 26 corresponding to the exemplary embodiment of FIG. 3, with the inlet piece 6' being connected to the first jacket-sheath 9' and the outlet piece 7' being connected to the second jacket-sheath 26. As per the exemplary embodiment in FIG. 5, the dividing rib 13" is arranged on the first inner tube piece 4" of the resonator 1". At its end facing away from the inlet piece 6', the first inner tube piece 4" has a ring-shaped lateral wall 12", which forms the lateral delimitation of the first ring-shaped chamber 2" in the direction of the outlet piece 7' and by means of which the first inner tube piece 4" is connected to the pot-like first jacket-sheath 9'.

As shown in the exemplary embodiment in FIG. 5, the first sub-chamber 14" has two control fins 22", 23" while the second sub-chamber 15" has no control fins. The first sub-chamber 14" has wall apertures 29" between the control fins 22" and 23" and has wall apertures 30 between the control fin 23" and the lateral wall 11'. The pot-like first jacket-sheath 9' forms the outer wall 10" of the first ring-shaped chamber 2" opposite the dividing wall 13". The second sub-chamber 15" has wall apertures 28" in the first inner tube piece 4" between the dividing rib 13" and the lateral wall 12".

The embodiments discussed in the specific description and shown in the figures obviously represent merely illustrative embodiments of the present invention. For example, the inlet and outlet, i.e. the flow direction, can be reversed. In addition to being applied to cylindrical cross-sections, the functional principle can also be used in connection with other cross-sectional shapes. In the light of the present disclosure a person skilled in the art has a broad spectrum of optional variations available.

LIST OF REFERENCE NUMBERS 1, 1', 1" resonator
2, 2', 2" first ring-shaped chamber
3 inner tube
4, 4" first inner tube piece
5 second inner tube piece 6, 6' inlet piece
7, 7' outlet piece
8 longitudinal axis
9, 9' first jacket-sheath
10, 10', 10" outer wall of 2
11, 11' lateral wall of 9
12, 12', 12" lateral wall of 4
13, 13', 13" dividing rib
14, 14', 14" first sub-chamber of 2
15, 15', 15" second sub-chamber of 2
16 annular space
17 gap of 13
18 wall aperture of 3
19 wall aperture of 3
20 control fin of 14
21 control fin of 14
22, 22', 22" control fin of 15
23, 23'. 23" control fin of 15
24 height of annular space 16
25 base
26 second jacket-sheath
27 second ring-shaped chamber
28, 28" wall aperture of 4
29, 29" wall aperture of 4
30, 30" wall aperture of 4

The invention claimed is:

1. A resonator (1, 1', 1") for reducing airborne noise, the resonator comprising:
at least one first ring-shaped chamber (2, 2', 2") arranged between an inlet piece (6, 6') and an outlet piece (7, 7'), and having an inner tube (3) or inner tube pieces (4, 4", 5) arranged between the inlet piece (6, 6') and outlet piece (7, 7'); and
at least one radially encircling dividing rib (13, 13', 13") dividing the first ring-shaped chamber (2, 2', 2") into at least two sub-chambers (14, 14', 14", 15, 15', 15"), the dividing rib (13, 13', 13") having a free end that is spaced from the wall that is adjacent in a radial direction to form an encircling annular space (16) that has a radial dimension of between 0.3 and 2 mm, the dividing rib (13, 13', 13") being a circumferential double rib that delimits a circumferential gap (17), the gap (17) being open in a direction of the annular space (16), the inner tube (3) or inner tube pieces (4, 4") that delimit the sub-chambers (14, 14', 14", 15, 15', 15") having wall apertures (18, 19, 28, 28", 29, 29", 30, 30") that provide communication to the adjacent sub-chamber (14, 14', 14'", 15, 15', 15"), wherein the annular space (16) between the free end of the of the dividing rib (13, 13', 13") and the wall that is adjacent in a radial direction receives an air layer that co-resonates in steady-state fashion in the radial direction to prevent leakage flows between the sub-chambers.

2. The resonator of claim 1, wherein at least one of the sub-chambers (14, 14", 15, 15') has at least one circumferential control fin (20, 21, 22, 22', 22", 23, 23', 23").

3. The resonator of claim 2, wherein a radial dimension of the control fin (20, 21, 22, 22', 22", 23, 23', 23") is less than or equal to a radial dimension of the dividing rib (13, 13', 13").

4. The resonator of claim 1, wherein the radial dimension of the annular space is between 0.5 and 1.5 mm.

5. The resonator of claim 4, wherein the radial dimension of the annular space is 1 mm.

6. The resonator of claim 1, wherein the dividing rib (13, 13', 13") is arranged on the inner tube (3) or the inner tube piece (4, 4"), and the wall adjacent to the free end of the dividing rib (13, 13', 13") is the outer wall (10, 10', 10") of the first ring-shaped chamber (2, 2', 2").

7. The resonator of claim 1, wherein the inlet piece (6, 6') is attached to a first jacket-sheath (9, 9') that includes the outer wall (10, 10', 10") of the first ring-shaped chamber (2, 2', 2") and a ring-shaped lateral wall of which (11, 11') that is connected to the inlet piece (6, 6') and forms the lateral delimitation of the first ring-shaped chamber (2, 2', 2") in a direction of the inlet piece (6, 6').

8. The resonator of claim 7, wherein the outlet piece (7) is formed by an extension of the inner tube (3), and, in the direction of the inlet piece (6), the outlet piece (7) has a ring-shaped lateral wall (12) that forms a lateral delimitation of the first ring-shaped chamber (2) in a direction of the outlet piece (7).

9. The resonator of claim 7, wherein an end of the first inner tube piece (4, 4") facing away from the inlet piece (6'), has a ring-shaped lateral wall (12', 12") that forms the lateral delimitation of the first ring-shaped chamber (2', 2") towards the outlet piece (7') and by means of which the inner tube piece (4, 4") is attached to the first jacket-sheath (9').

10. The resonator of claim 9, wherein the outlet piece (7') transitions into a second inner tube piece (5), and the outlet piece (7') penetrates the base (25) of a pot-shaped second jacket-sheath (26), the pot-shaped second jacket-sheath (26) having a cylindrical wall, an end of the cylindrical wall of the pot-shaped second jacket-sheath (26) facing toward the first jacket-sheath (9') and being connected to the ring-shaped lateral wall (12', 12") that also forms a first lateral wall for a second ring-shaped chamber (27), the base (25) of the second jacket-sheath (26) forming a second lateral wall of the second ring-shaped chamber (27).

* * * * *